United States Patent [19]

Brushaber

[11] Patent Number: 4,645,422
[45] Date of Patent: Feb. 24, 1987

[54] ANTI-THEFT DEVICE FOR MARINE PROPELLERS

[76] Inventor: Donald Brushaber, 211 Hayes Ct., Normandy Beach, N.J. 08739

[21] Appl. No.: 805,781

[22] Filed: Dec. 6, 1985

[51] Int. Cl.$^4$ .............................................. B63H 1/20
[52] U.S. Cl. ........................... 416/93 A; 416/146 R; 416/244 B; 416/245 A; 70/232; 411/910
[58] Field of Search ............ 416/146 B, 93 A, 244 B, 416/245 A; 70/229-232; 411/903, 910

[56] References Cited

U.S. PATENT DOCUMENTS

| | | | |
|---|---|---|---|
| 2,351,356 | 6/1944 | Meyer | 416/146 B X |
| 3,732,033 | 5/1973 | Macchi | 416/244 B |
| 3,792,938 | 2/1974 | Wilde | 416/146 B X |
| 3,957,394 | 5/1976 | Chaskin | 416/244 B |
| 3,978,699 | 9/1976 | Kay'Triniak | 70/232 |
| 3,981,165 | 9/1976 | Wersinger | 70/232 |
| 3,981,617 | 9/1976 | Milewicz | 416/244 B |
| 4,077,742 | 3/1978 | Goodwin | 416/245 A |
| 4,336,698 | 6/1982 | Hurd | 70/231 |
| 4,538,962 | 9/1985 | McCain | 416/244 B |

FOREIGN PATENT DOCUMENTS 769134 10/1980 U.S.S.R. ............................... 411/910

Primary Examiner—Everette A. Powell, Jr.
Attorney, Agent, or Firm—Samuelson & Jacob

[57] ABSTRACT

An anti-theft device for a marine propeller has a spinnerplaced over the propeller nut which secures the propeller to the propeller shaft, and the spinner is held in place against unauthorized removal by a lock pin projecting from the propeller nut into an annular recess in the spinner, enabling the spinner to spin freely relative to the propeller nut while capturing the spinner against axial movement which would expose the propeller nut for unauthorized wrenching, the spinner including a radially extending access passage for gaining access to the lock pin with an authorized drive member to move the lock pin out of the annular recess for selective release of the spinner from the propeller nut and authorized access to the propeller nut for wrenching.

16 Claims, 4 Drawing Figures

ANTI-THEFT DEVICE FOR MARINE PROPELLERS

The present invention relates generally to the prevention of theft of marine propellers and pertains, more specifically, to an anti-theft device especially well-suited for use in connection with propellers found in outboard and inboard-outboard marine drive units.

The increasing popularity of pleasure boating coupled with the increasing expense of purchasing and maintaining boating equipment has led to the need for effective protection against losses due to theft of component parts of marine equipment. In my earlier patent application, Ser. No. 667,547, filed Nov. 2, 1984, I addressed the problem of preventing theft of entire outboard drive units of inboard-outboard drive systems and disclosed a relatively simple device for that purpose. I now find that just the marine propellers alone have become targets for theft.

Various marine propeller locks have been proposed in the past. Among the more compact devices designed to remain in place during regular use of the propeller are those disclosed in U.S. Pat. No. 3,732,033 and U.S. Pat. No. 3,981,617. Each of these devices rely upon key-operated locks in which the key-hole is openly accessible and therefore readily susceptible to tampering and removal of the lock by well-known lock-attacking techniques. Other marine propeller security devices are found in U.S. Patent Nos. 3,759,076, 3,981,165 and 4,257,247. However, these devices of the type which must be removed during use of the propeller drive system.

Accordingly, it is an object of the present invention to provide a relatively simple, yet highly effective device for preventing the theft of marine propellers.

Another object of the invention is to provide an anti-theft device for marine propellers which is compatible with a wide variety of propeller installations without requiring a major modification of the installation for effective use.

Still another object of the invention is to provide an anti-theft device for marine propellers which is compact and remains in place during regular use of the marine drive unit.

Yet another object of the invention is to provide an anti-theft device for marine propellers which is simple to install, yet is effective in use, and is removed readily for authorized removal of a propeller, all without requiring special tools or techniques.

A further object of the invention is to provide an anti-theft device for marine propellers which is relatively inexpensive to manufacture so as to be made available readily in large numbers for widespread, practical use.

A still further object of the invention is to provide a device of the type described and which will perform in a dependable manner over a long service life.

The above objects, as well as still further objects and advantages, are attained by the present invention which may be described briefly as an anti-theft device for securing a marine propeller to a propeller shaft, against unauthorized removal, the propeller shaft having a forward support portion for receiving the hub of the propeller and a threaded end portion extending aft beyond the propeller hub for receiving a propeller nut which secures the propeller in place upon the propeller shaft, the propeller nut including an outer surface having a given overall diameter and a wrenching configuration on the outer surface, the anti-theft device comprising: a spinner having a generally smooth-contoured outer surface and a generally cylindrical inner bore extending axially between a forward end and an aft end and having a diameter complementary to the overall diameter of the outer surface of the propeller nut so that the spinner may be slipped over the wrenching configuration of the propeller nut and placed in free-spinning relationship with the propeller nut, with the wrenching configuration enveloped within the spinner such that the spinner precludes wrenching access to the propeller nut; an annular recess in the spinner communicating with the inner bore between the forward and aft ends of the inner bore and having a diameter greater than the diameter of the inner bore; an access passage extending generally radially from the annular recess to the outer surface of the spinner; a lock pin capable of alignment with the access passage and having a projection receivable within the annular recess in the spinner; and an anti-tamper means for securing the lock pin to the propeller nut, against unauthorized removal, the anti-tamper means being capable of operation through the access passage in the spinner to enable the lock pin to be secured selectively to the propeller nut when the spinner is in the free-spinning relationship, with the projection entering the annular recess and capturing the spinner axially with respect to the propeller nut so as to secure the spinner against axial movement relative to the propeller nut and release of the spinner from the propeller nut, while enabling the spinner to spin freely upon the propeller nut, whereby unauthorized wrenching access to the wrenching configuration of the propeller nut is precluded.

The invention will be understood more fully, while still further objects and advantages will become apparent, in the following detailed description of a preferred embodiment of the invention illustrated in the accompanying drawing, in which.

Figure 1:
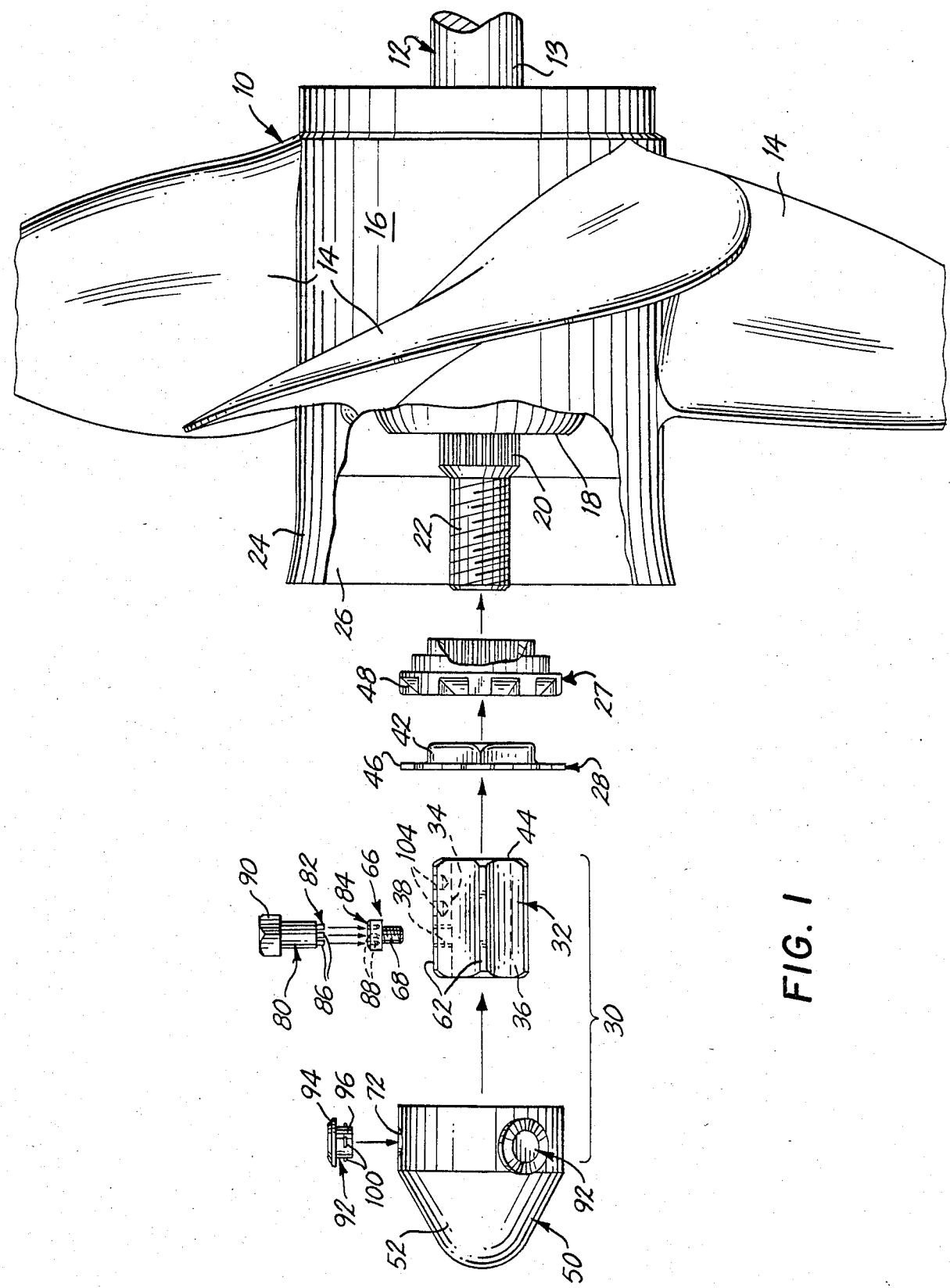
FIG. 1 is an exploded elevational view of an anti-theft device constructed in accordance with the invention and about to be assembled in connection with a marine propeller and propeller shaft.

Referring now to the drawing, and especially to FIG. 1 thereof, a marine propeller 10 is seen mounted upon a propeller shaft 12 and about to be secured in place thereon. Propeller 10 includes a plurality of propeller blades 14 which project radially outwardly from a central hub 16. Propeller shaft 12 has a forward support portion 13 and extends axially aft beyond the terminus 18 of hub 16, presenting an exposed splined segment 20 and a threaded end portion 22. A generally cylindrical barrel 24 extends aft coaxial with propeller shaft 12 and provides an exhaust passage 26 for the exhaust emanating from the marine engine (not shown) which drives the propeller shaft 12.

Ordinarily, a propeller nut is threaded onto threaded end portion 22 of propeller shaft 12 and is retained in place by a retainer system shown in the form of a splined coupling 27 and a star retainer 28, in a manner which will be described more fully below. In the present case, the same retainer system is utilized; however, the propeller nut is replaced by an anti-theft device 30 constructed in accordance with the present invention.

Anti-theft device 30 includes a propeller nut 32 which replaces a standard propeller nut, but provides the same threaded opening 34, complementary to threaded end portion 22 of propeller shaft 12, and the same hexagonal wrenching configuration 36 on the external surface of the propeller nut 32. However, propeller nut 32, unlike a standard propeller nut, includes a threaded hole 38 extending radially into the body of the propeller nut.

Figure 2:
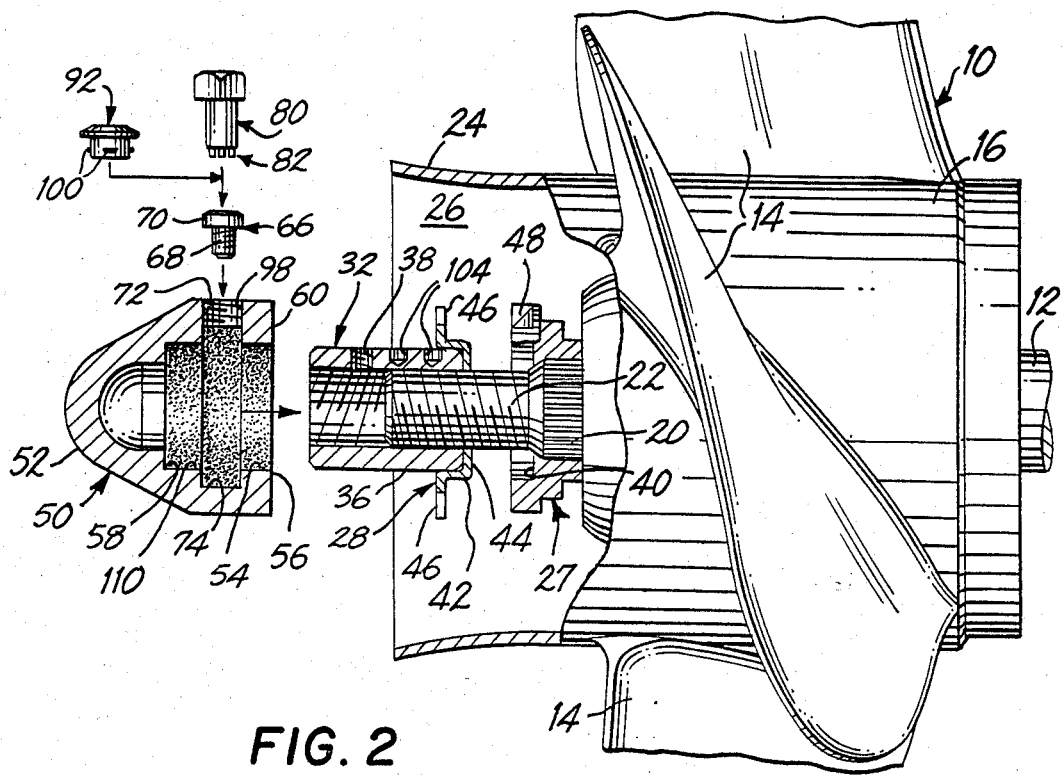
FIG. 2 is a partially exploded view similar to FIG. 1.
Figure 3:
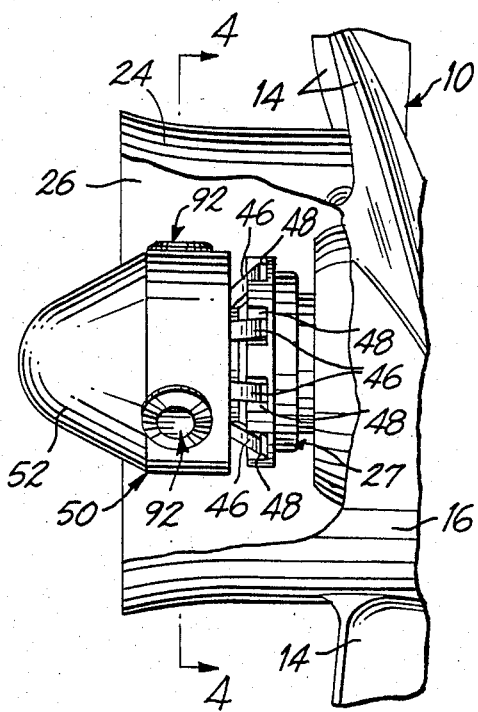
FIG. 3 is an elevational view, partially sectioned, showing the anti-theft device assembled in place in connection with a marine propeller and propeller shaft.

Turning now to FIGS. 2 and 3, as well as to FIG. 1, splined coupling 27 is slipped onto the propeller shaft 12, over threaded end portion 22 and into engagement with splined segment 20. An annular recess 40 in the splined coupling 27 receives cupped portion 42 of star retainer 28, the relative dimensions of the cupped portion 42 and annular recess 40 being such that star retainer 28 may rotate relative to splined coupling 27, which itself is fixed for rotation only with rotation of propeller shaft 12 by virtue of the coupled splines. Cupped portion 42 has a hexagonal configuration complementary to the hexagonal wrenching configuration 36 of the propeller nut; hence, end 44 of propeller nut 32 enters cupped portion 42 so that rotation of propeller nut 32 as the propeller nut is threaded onto threaded end portion 22 will rotate star retainer 28 until the star retainer 28 is seated within splined coupling 27, with propeller nut 32 seated in the cupped portion 42 of star retainer 28 and the propeller 10 secured on the propeller shaft 12. In order to preclude inadvertent rotation of propeller nut 32, radially projecting tabs 46 of the star retainer 28 are bent into corresponding radial notches 48 in the splined coupling 27 so that the end 44 which is captured within cupped portion 42 now prevents rotation of the propeller nut 32.

Figure 4:
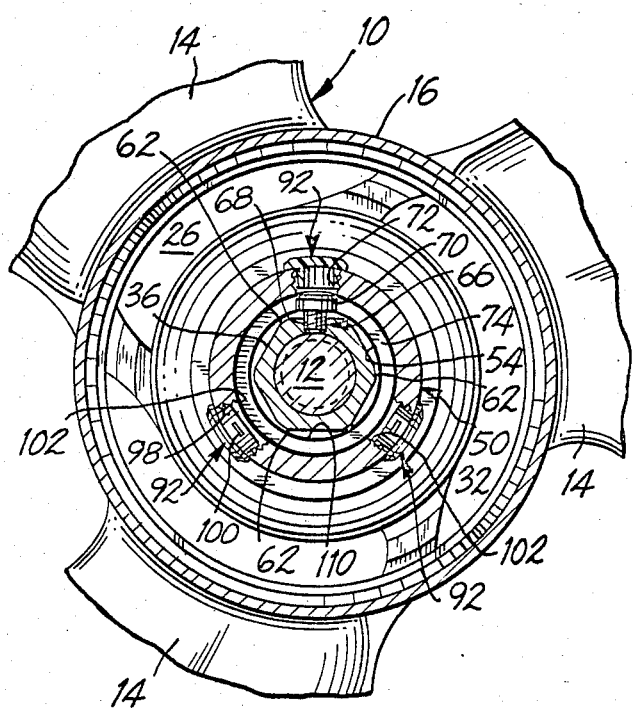
FIG. 4 is a cross-sectional view taken along line 4—4 of FIG. 3.

In order to prevent theft of the propeller 10, anti-theft device 30 includes a spinner 50 having a smooth-contoured outer surface 52 and a generally cylindrical inner bore 54 extending between a first end 56 and a second end 58. As best seen in FIGS. 3 and 4, inner bore 54 has a diameter generally complementary to the overall diameter of propeller nut 32 so that spinner 50 may be slipped over propeller nut 32 and rotates freely relative to propeller nut 32. The outer diameter of spinner 50, adjacent the forward end 60 of the spinner 50, is at least about the diameter of the star retainer 28. Once the spinner 50 is in place over the propeller nut 32, as shown in FIGS. 3 and 4, the spinner envelops the propeller nut and access to the hexagonal wrenching configuration 36 of propeller nut 32 is closed off, as is access to the bent tabs 46 of star retainer 28, by virtue of the close proximity of the forward end 60 of the spinner 50 with the star retainer 28 and the bent tabs 46 thereof. The freely-rotating relationship between the spinner 50 and the propeller nut 32 precludes rotation of the propeller nut 32 when the spinner 50 is in place. Preferably, the apices 62 (see FIG. 4) of the wrenching configuration 36 of propeller nut 32 are somewhat rounded to facilitate free rotation of the spinner 50 upon propeller nut 32. Thus, apices 62 are somewhat arcuate and lie along a circle having a diameter complementary to the diameter of inner bore 54, while a sufficient portion of the hexagonal wrenching configuration 36 is maintained for wrenching purposes. Such a free-spinning relationship is suggested as an anti-theft measure in the device disclosed in U.S. Pat. No. 4,057,985.

However, in the present device, spinner 50 is secured in place upon propeller nut 32 by a lateral lock pin 66 having a threaded stem 68 and a projection in the form of a head 70 unitary with stem 68. Once propeller nut 32 is seated properly upon propeller shaft 12 and spinner 50 is located properly upon propeller nut 32, lock pin 66 is inserted through a radially extending access passage 72 in spinner 50, and stem 68 is threaded into threaded hole 38 in propeller nut 32. Head 70 of lock pin 66 then projects into an annular recess 74 which communicates with inner bore 54 of spinner 50 and secures the spinner against removal from the propeller nut 32, while enabling free rotation of the spinner 50 relative to the propeller nut 32. Annular recess 74 is located axially between the ends 56 and 58 of the inner bore 54.

Turning of the lock pin 66 into threaded engagement with the threaded hole 38 of the propeller nut 32 is accomplished by anti-tamper means including a drive member 80 having an anti-tamper wrenching configuration 82 for engaging a complementary anti-tamper wrenching configuration 84 in the head 70. In this instance, the complementary anti-tamper wrenching configurations are in the form of a series of projections 86 and complementary recesses 88, located in a manner similar to that suggested in U.S. Pat. Nos. 4,018,111 and 4,302,137. Drive member 80 includes a drive head 90 having a standard hexagonal wrenching configuration so that a standard wrench may be utilized, in conjunction with drive member 80, to seat or unseat lock pin 66. Without the appropriate drive member, coded to the particular anti-tamper wrenching configuration 84 of head 70, removal of lock pin 66 is precluded and theft is deterred.

In order to further deter unauthorized removal of lock pin 66, access passage 72 is located in spinner 50 far enough forward so as to be within the enclosure provided by barrel 24. In this manner, access to lock pin 66 is rendered very limited and is facilitated only by possession of the appropriate drive member 80 which has a length short enough to be placed between the barrel 24 and the spinner 50 and long enough to reach through access passage 72 to the head 70 of lock pin 66. Once lock pin 66 is secured in place within propeller nut 32, drive member 80 is removed from access passage 72 and a cover 92 preferably is seated within access passage 72 to close the access passage 72 against any debris which might otherwise clog the access passage 72 and render difficult even authorized access to lock pin 66. Cover 92 preferably is constructed of an elastomeric or synthetic resin material and includes a cap 94 and a stem 96 which projects into access passage 72. Access passage 72 may be threaded or otherwise ridged, as at 98, and stem 96 may include resilient teeth 100 for gripping the threaded or ridged surface of access passage 72 to secure cap 94 in place.

In order to reduce any deleterious imbalance in the rotating component parts, the presence of access passage 72 is balanced by placing two further similar passages 102 at circumferential locations which will balance the spinner 50 about the central axis of rotation of the spinner 50. Likewise, the added weight of lock pin 66 may be balanced by the removal of material from propeller nut 32 at holes 104.

Spinner 50 preferably is fabricated of a lightweight material, such as aluminum, so as to reduce weight, and especially the weight of any rotating component parts. Since such lightweight materials usually are softer materials and are more susceptible to wear, it has been found advantageous to provide a coating 110 of wear-resistant material along the inner bore 54 and annular recess 74. The outer surface 52 of spinner 50 not only is smooth-contoured, but has a tapered configuration so as to provide a smooth and continuous passage for exhaust gases passing between the barrel 24 and the spinner 50.

The anti-theft device 30 of the present invention provides a simple yet effective device for deterring theft of a marine propeller. The utilization of the lateral lock pin 66 enables the elimination of exposed, axially accessible key-operated locks, as found in U.S. Pat. Nos. 3,732,033, 3,981,617 and 4,059,985, and merely requires a simple drive member 80, easily driven by a conventional wrench.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. An anti-theft device for securing a marine propeller to a propeller shaft, against unauthorized removal, the propeller shaft having a forward support portion for receiving the hub of the propeller and a threaded end portion extending aft beyond the propeller hub for receiving a propeller nut which secures the propeller in place upon the propeller shaft, the propeller nut including an outer surface having a given overall diameter and a wrenching configuration on the outer surface, said anti-theft device comprising:

a spinner having a generally smooth-contoured outer surface and a generally cylindrical inner bore extending axially between a forward end and an aft end and having a diameter complementary to the overall diameter of the outer surface of the propeller nut so that the spinner may be slipped over the wrenching configuration of the propeller nut and placed in free-spinning relationship with the propeller nut, with the wrenching configuration enveloped within the spinner such that the spinner precludes wrenching access to the propeller nut;

an annular recess in the spinner communicating with the inner bore between the forward and aft ends of the inner bore and having a diameter greater than the diameter of the inner bore;

an access passage extending generally radially from the annular recess to the outer surface of the spinner;

a lock pin capable of alignment with the access passage and having a projection receivable within the annular recess in the spinner; and an anti-tamper means for securing the lock pin to the propeller nut, against unauthorized removal, said anti-tamper means being capable of operation through the access passage in the spinner to enable the lock pin to be secured selectively to the propeller nut when the spinner is in said free-spinning relationship, with the projection entering the annular recess and capturing the spinner axially with respect to the propeller nut so as to secure the spinner against axial movement relative to the propeller nut and release of the spinner from the propeller nut, while enabling the spinner to spin freely upon the propeller nut, whereby unauthorized wrenching access to the wrenching configuration of the propeller nut is precluded.

2. The invention of claim 1 including a retainer between the propeller nut and the propeller hub for selectively precluding rotation of the propeller nut relative to the propeller hub, and wherein the forward end of the spinner is juxtaposed with the retainer when the spinner is placed in said free-spinning relationship with the propeller nut, the forward end having a diameter great enough to block access to the retainer when the forward end is so juxtaposed with the retainer.

3. The invention of claim 1 wherein:
the propeller nut includes a radially extending threaded hole aligned with the recess in the spinner when the spinner is in said free-spinning relationship with the propeller nut;
the lock pin includes a threaded stem for engaging the threaded hole, and a head at the projection; and
the anti-tamper means includes an anti-tamper wrenching configuration in the head of the lock pin and a complementary anti-tamper drive member selectively received within the access passage for wrenching engagement with the anti-tamper wrenching configuration to enable authorized withdrawal of the lock pin from the recess, with concomitant authorized removal of the spinner for authorized access to the wrenching configuration of the propeller nut.

4. The invention of claim 3 wherein the relative dimensions of the lock pin and the access passage enable the lock pin to be withdrawn from the propeller nut, through the access passage, to release the spinner for axial movement relative to the propeller nut and concomitant exposure of the propeller nut for authorized wrenching.

5. The invention of claim 1 wherein the propeller is of the type having a cylindrical barrel extending aft from the hub coaxial with the propeller shaft and generally surrounding the threaded end portion of the propeller shaft, and the access passage is located axially along the spinner such that the barrel extends over the access passage when the spinner is captured axially, in said free-spinning relationship, upon the propeller nut.

6. The invention of claim 5 including a retainer between the propeller nut and the propeller hub for selectively precluding rotation of the propeller nut relative to the propeller hub, and wherein the forward end of the spinner is juxtaposed with the retainer when the spinner is placed in said free-spinning relationship with the propeller nut, the forward end having a diameter great enough to block access to the retainer when the forward end is so juxtaposed with the retainer.

7. The invention of claim 5 wherein:
the propeller nut includes a radially extending threaded hole aligned with the recess in the spinner when the spinner is in said free-spinning relationship with the propeller nut;
the lock pin includes a threaded stem for engaging the threaded hole, and a head at the projection; and
the anti-tamper means includes an anti-tamper wrenching configuration in the head of the lock pin and a complementary anti-tamper drive member selectively received within the access passage for wrenching engagement with the anti-tamper wrenching configuration to enable authorized withdrawal of the lock pin from the recess, with concomitant authorized removal of the spinner for authorized access to the wrenching configuration of the propeller nut.

8. The invention of claim 7 wherein the relative dimensions of the lock pin and the access passage enable the lock pin to be withdrawn from the propeller nut, through the access passage, to release the spinner for axial movement relative to the propeller nut and concomitant exposure of the propeller nut for authorized wrenching.

9. The invention of claim 8 including a retainer between the propeller nut and the propeller hub for selectively precluding rotation of the propeller nut relative to the propeller hub, and wherein the forward end of the spinner is juxtaposed with the retainer when the spinner is placed in said free-spinning relationship with the propeller nut, the forward end having a diameter great enough to block access to the retainer when the forward end is so juxtaposed with the retainer.

10. The invention of claim 1 wherein the spinner includes at least one further passage extending radially between the inner bore and the outer surface and located circumferentially relative to the access passage for balancing the weight of the spinner about the axis of rotation of the spinner.

11. The invention of claim 10 including a selectively removable cover over each passage.

12. The invention of claim 1 wherein the propeller nut includes at least one further hole located relative to the threaded hole for balancing the weight of the lock pin about the axis of rotation of the propeller nut.

13. The invention of claim 12 wherein the spinner includes at least one further passage extending radially between the inner bore and the outer surface and located circumferentially relative to the access passage for balancing the weight of the spinner about the axis of rotation of the spinner.

14. The invention of claim 1 including a wear-resistant coating upon the inner bore of the spinner.

15. The invention of claim 14 wherein the wear-resistant coating extends along the annular recess of the spinner.

16. The invention of claim 1 including a selectively removable cover over the access passage.

* * * * *